(12) United States Patent
Teixeira

(10) Patent No.: US 8,684,388 B1
(45) Date of Patent: Apr. 1, 2014

(54) HEAD TUBE WELD JOINT

(71) Applicant: Specialized Bicycle Components, Inc., Morgan Hill, CA (US)

(72) Inventor: Chuck Teixeira, Bonny Doon, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/685,598

(22) Filed: Nov. 26, 2012

(51) Int. Cl.
*B62K 19/20* (2006.01)

(52) U.S. Cl.
USPC .............. 280/281.1; 280/288.3; 280/288.4; 280/274; 428/544; 228/173.4; 403/270; 403/271; 403/272

(58) Field of Classification Search
USPC ......... 280/281.1, 288.3, 288.4, 274; 428/544; 228/173.4; 403/270–272
See application file for complete search history.

(56) References Cited

U.S. PATENT DOCUMENTS

| | | | | |
|---|---|---|---|---|
| 4,140,204 A | * | 2/1979 | Wilson | 181/265 |
| 4,699,233 A | * | 10/1987 | Koga et al. | 180/219 |
| 5,249,818 A | | 10/1993 | Patterson | |
| 5,255,932 A | | 10/1993 | Moore | |
| 5,423,564 A | * | 6/1995 | Harvey | 280/281.1 |
| 5,980,505 A | * | 11/1999 | Wilson | 604/525 |
| 6,060,682 A | * | 5/2000 | Westbroek et al. | 219/121.64 |
| 6,375,210 B1 | | 4/2002 | Lam | |
| 6,481,522 B1 | * | 11/2002 | Adachi | 180/219 |
| 7,052,029 B2 | | 5/2006 | Chamberlain | |
| 7,059,620 B2 | | 6/2006 | Chamberlain et al. | |
| 7,377,535 B2 | | 5/2008 | Chamberlain | |
| 7,413,208 B2 | | 8/2008 | Weng | |
| 7,494,146 B2 | | 2/2009 | Tseng | |
| 7,635,141 B2 | | 12/2009 | O'Connor | |
| 8,042,822 B2 | | 10/2011 | D'Aluisio | |
| 8,167,327 B2 | * | 5/2012 | Chamberlain | 280/279 |
| 8,272,656 B2 | * | 9/2012 | Katsura | 280/279 |

FOREIGN PATENT DOCUMENTS

EP 399075 A1 4/1993

* cited by examiner

*Primary Examiner* — Joseph M Rocca
*Assistant Examiner* — Marlon Arce
(74) *Attorney, Agent, or Firm* — Knobbe, Martens, Olson & Bear, LLP

(57) ABSTRACT

A bicycle having a first tube with a first tube portion and a first weld portion. The first tube portion has a first tube portion thickness and the first weld portion has a first weld portion thickness. The first weld portion has a first mating surface. A second tube having a second tube portion and a second weld portion. The second tube portion has a second tube portion thickness and the second weld portion has a second weld portion thickness. The second weld portion has a second mating surface. The first mating surface is positioned adjacent to the second mating surface, forming a weld interface between the first tube and the second tube. A weld bead formed along the weld interface coupling the first weld portion and the second weld portion.

20 Claims, 12 Drawing Sheets

HEAD TUBE WELD JOINT

BACKGROUND

1. Field of the Invention

The present disclosure relates to bicycle frames, and particularly to an improved weld joint structure for a bicycle frame.

2. Description of the Related Art

Bicycle frames are commonly manufactured from tubes that are coupled together into a desired configuration. A bicycle can have a top tube, a head tube and a down tube. The top tube and down tube are coupled to the head tube. The down tube and top tube extend rearward from the head tube. Metal tubes (i.e., steel, aluminum, titanium, etc.) can be welded together to form the bicycle frame.

SUMMARY

One inventive aspect is the recognition that welds between the top tube, down tube, and head tube can be problematic because cracks can initiate at stress points located at the crown and saddle points of the weld. There is also generally a separation between the top tube and down tube. Due to the separation and the angle of the tubes, it creates a zone that is difficult for a welder to access.

Additionally, when the joint is welded, weld heat and cooling shrinkage tends to pull the tubes together, which can further reduce the area between the tubes and the weld angle. The weld cooling creates shrinkage, which can create stress. Closing gaps between tubes with weld filler is not ideal and can lock in a significant amount of stress. Residual stress can weaken the joint and reduce the strength and fatigue life of the frame.

Further, the performance of the weld is substantially dependent upon the skill of the welder. The weld fillet size, shape, smoothness and strength are defined by the welder which can lead to inconsistency in frame performance.

The present disclosure relates an improved weld joint portion or structure between two or more parts on a bicycle. In one embodiment an engineered weld portion desirably is provided that defines a weld joint between a top tube, down tube, and head tube. The engineered weld portions eliminate separation between the top tube and down tube. The characteristics of the weld joint are also desirably substantially defined by the shape and configuration of the weld portions. The defined weld joint is desirably easier to weld and reduces weld variability. By reducing variability of the weld joint, strength and fatigue life of the weld joint desirably can be more accurately assessed and calculated during design and engineering, rather than dependent on the skill of the welder during manufacturing.

The weld portions can desirably improve performance of the weld. The weld portions desirably form a weld joint that reduces the tendency of the top tube and down tube to pull together, which reduces residual stress on the joint and in the frame. Additionally due to the reduced stress, desirably the tubes can be made thinner and lighter without losing strength. In addition the reduction in tube size can increase the freedom in design to enhance the look as well as performance. This method can also be used to decrease the head tube length and height for greater stand-over clearance and lower bar height. For example, in some instances, the top tube height can be reduced by 15-20%.

One embodiment of a bicycle includes a first tube and a second tube. The first tube has a first tube portion and a first weld portion. The first tube portion has a first tube portion thickness and the first weld portion has a first weld portion thickness. The first weld portion has a first mating surface. The second tube has a second tube portion and a second weld portion. The second tube portion has a second tube portion thickness and the second weld portion has a second weld portion thickness. The second weld portion has a second mating surface. The first mating surface is positioned adjacent to the second mating surface, forming a weld interface between the first tube and the second tube. A weld bead is formed along the weld interface coupling the first weld portion and the second weld portion. The combined thickness of the first weld portion thickness and the second weld portion thickness is at least 1 millimeter.

In some embodiments of the bicycle, the first weld portion and the second weld portion are substantially triangular. The first weld portion can be integral with the first tube. The second weld portion can be integral with the second tube. The first weld portion thickness can be less than the first tube portion thickness. The second weld portion thickness can be less than the second tube portion thickness. The first weld portion thickness can be substantially the same as the first tube portion thickness. The second weld portion thickness can be substantially the same as the second tube portion thickness. The second tube portion thickness can be greater than the first tube portion thickness.

In some embodiments, the weld bead is not in contact the first tube portion and the second tube portion simultaneously. The weld angle can be greater than 90 degrees. The first weld portion can be substantially the same shape as the second weld portion. The weld interface can define a weld angle that is substantially constant along the length of the weld interface. The combined thickness of the first weld portion thickness and the second weld portion thickness can be 12 millimeters.

In another embodiment, a bicycle includes a first tube and a second tube. The first tube has a first tube portion and a first weld portion. The first tube portion has a first tube portion thickness and the first weld portion has a first weld portion thickness. The first weld portion has a first mating surface. The second tube has a second tube portion and a second weld portion. The second tube portion has a second tube portion thickness and the second weld portion has a second weld portion thickness. The second weld portion has a second mating surface. The first mating surface is positioned adjacent to the second mating surface, forming a weld interface between the first tube and the second tube. A weld bead is formed along the weld interface coupling the first weld portion and the second weld portion. The weld interface defines a weld angle that is at least 90 degrees along the length of the weld interface.

In some embodiments the weld angle varies along the length of the weld interface. The weld angle can be substantially constant along the length of the weld interface. The first mating surface and the second mating surface can be substantially planar. In some embodiments the first mating surface is convex and the second mating surface is concave.

In an embodiment of a method of welding a bicycle, the method includes positioning the top tube adjacent a head tube, the top tube having a first tube portion and a first weld portion. The method also includes positioning a down tube adjacent the head tube, the down tube having a second tube portion and a second weld portion. The method also includes positioning the first weld portion adjacent the second weld portion to form a weld interface, the weld interface defines a weld angle that is at least 90 degrees along the length of the weld interface. The method also includes welding the first weld portion and the second weld portion substantially at the weld interface.

DETAILED DESCRIPTION

Figure 1:
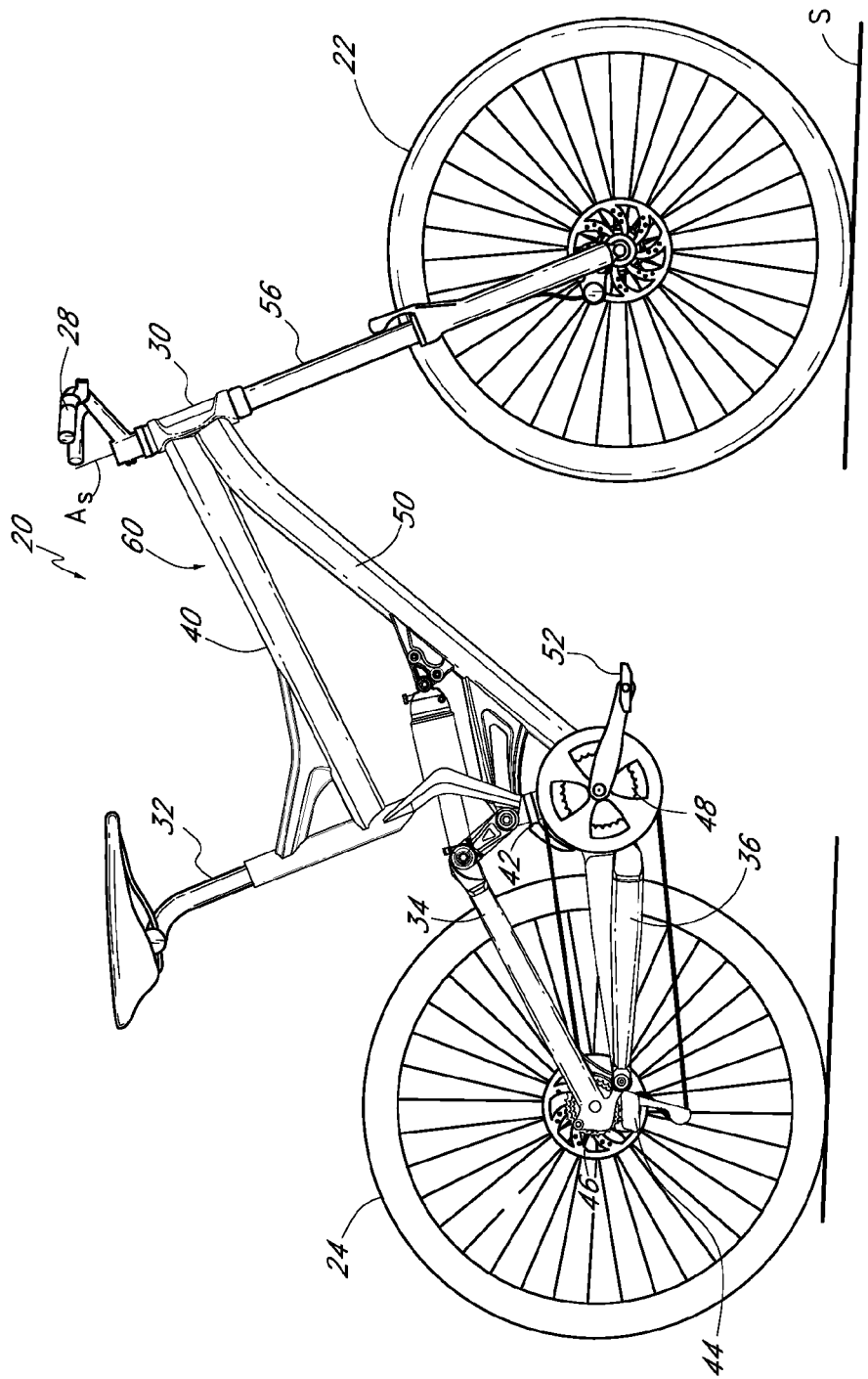
FIG. 1 is an embodiment of a bicycle.

FIG. 1 illustrates a bicycle 20 that includes a front wheel 22, a rear wheel 24, a frame 26, and a steering assembly 28. The frame 60 includes a top tube 40, a head tube 30, a down tube 50, a seat tube 32, seatstays 34, and chainstays 36. The bike can have a gear shifting system with front and rear derailleurs 42, 44, a cog set 46, and one or more chain rings 48. Pedals 52 are attached to a crankset 54 to allow a user to rotate the crankset 54 and to propel the bicycle 20. The head tube 30 is desirably configured to rotatably support a front fork 56, or front suspension fork, and defines a steering axis $A_s$.

In the illustrated arrangement, the frame 60 is constructed from a plurality of components that have been assembled together, preferably by a material deposition welding process. That is, preferably a brazing process or an arc welding process is used, such as a gas metal arc welding (GMAW or MIG) or gas tungsten arc welding (GTAW or TIG) welding process, which involves a temperature sufficiently high to melt the base materials of the frame components such that the filler material mixes with the base materials. Desirably, the components of the frame 60 are constructed from a metal material and, preferably, aluminum. However, other suitable materials may also be used. Furthermore, the frame 60 may employ more than one material.

Figure 2A:
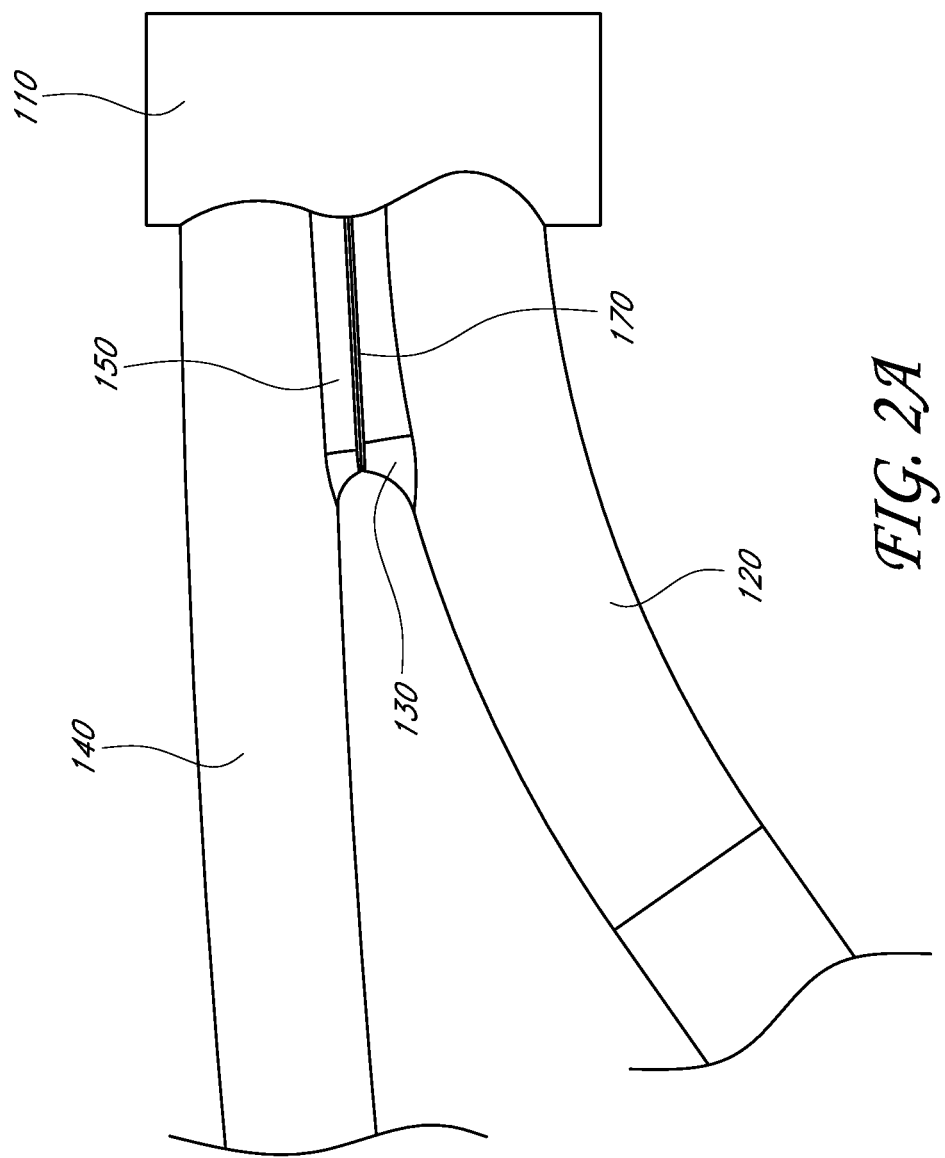
FIG. 2A is an embodiment of an assembly of a head tube, top tube, and down tube.

FIG. 2A is an embodiment of a frame assembly 100 having a top tube 140, a down tube 120, and a head tube 110. In this embodiment the top tube 140 and down tube 120 are round tubes. In other embodiments the top tube 140 and down tube 120 can be shaped tubes or non-round tubes. The top tube 140 extends in a rearward direction from the head tube 110. The down tube 140 extends in a rearward direction and slopes downwardly from the head tube 110. The down tube 120 and is situated below the top tube 140. The top tube has a first or top tube weld portion 150. The down tube has a second or down tube weld portion 130. The top tube weld portion 150 and down tube weld portion 130 contact one another for a significant distance extending in a rearward direction from the head tube 110. Desirably, the top tube 140 and the down tube 120 contact one another for at least 2 inches rearward of the head tube 110. Preferably the top tube 140 and head tube 110 contact each other for a greater length, such as 4 or 5 inches. Such an arrangement desirably creates a strong joint between the head tube 110, the top tube 140, and the down tube 120 and permits the top tube 140 and down tube 120 to reinforce one another. In addition the intersection between the top tube weld portion 150 and the down tube weld portion 130 provides an advantageously large distance over which the tubes 140 and 120 can be welded together.

Figure 2B:
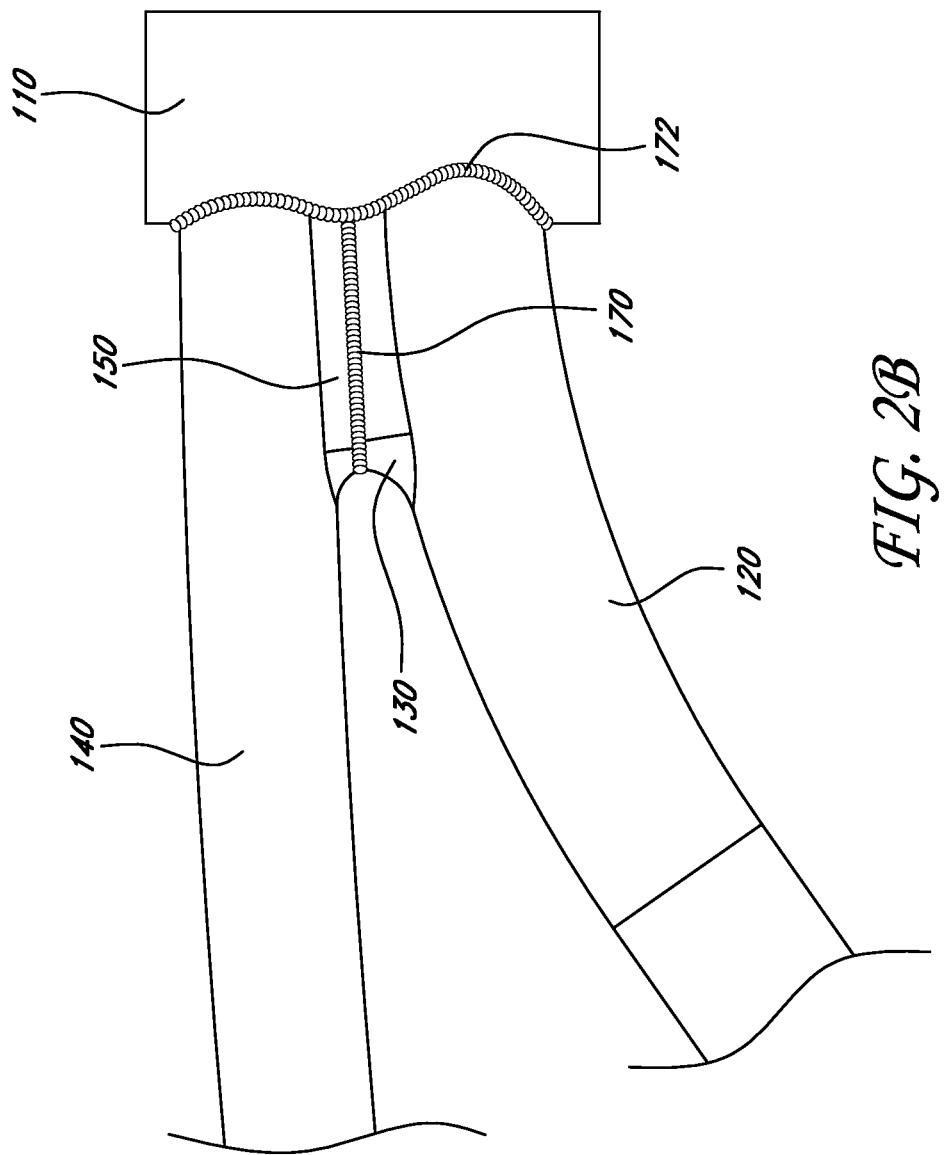
FIG. 2B is an embodiment of an assembly of a head tube, top tube, and down tube illustrating weld joints.

FIG. 2B illustrates an embodiment of a weld bead of weld joint 172 between the head tube 110, top tube 140 and down tube 120, such as a TIG weld joint, and the weld bead of weld joint 170 between the top tube weld portion 150 and the bottom tube weld portion 130. The weld joint 170 could be coupled together entirely by brazing, welding, or a combination of welding and brazing.

Figure 3:
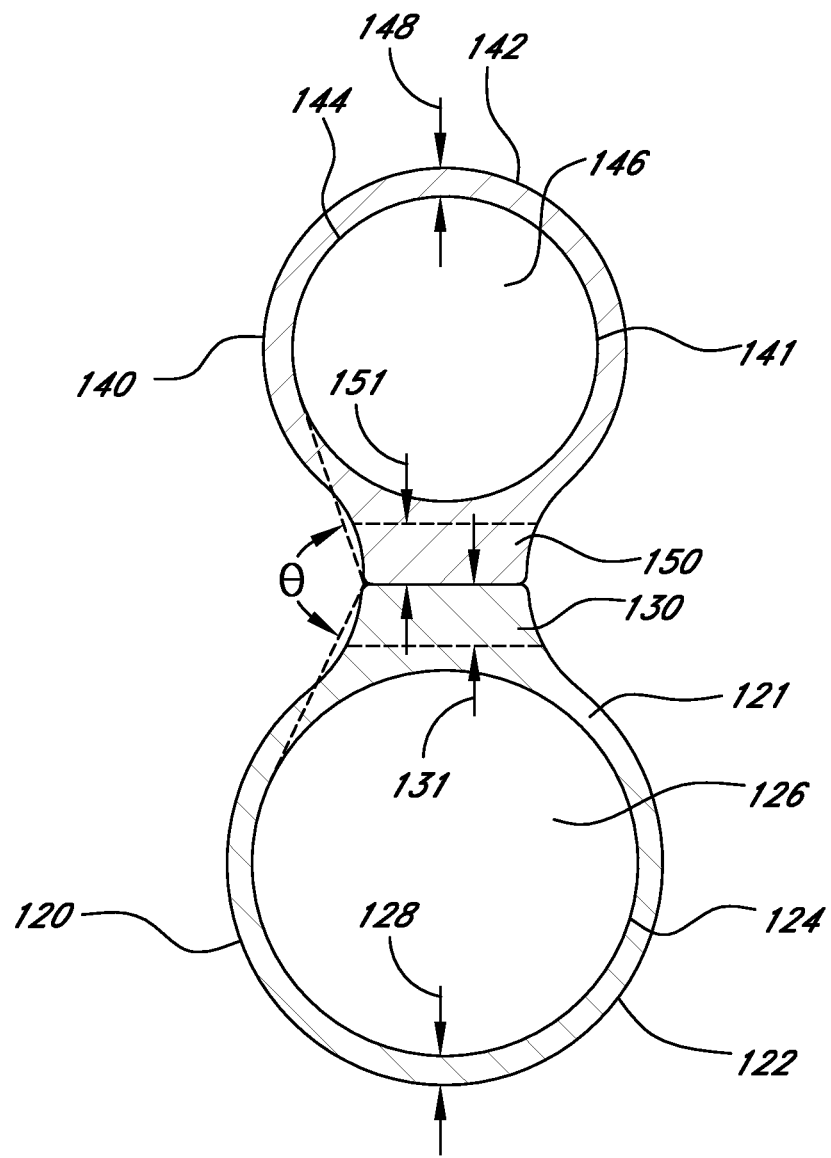
FIG. 3 is a cross section of the top tube and down tube from FIG. 2.
Figure 4A:
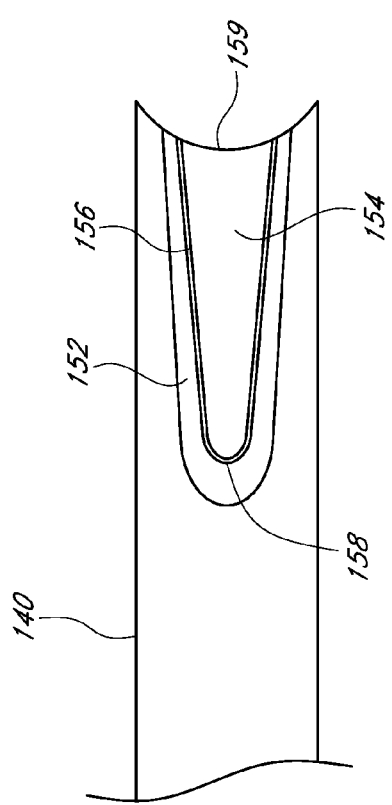
FIG. 4A is a view of the top tube from FIG. 2.
Figure 4B:
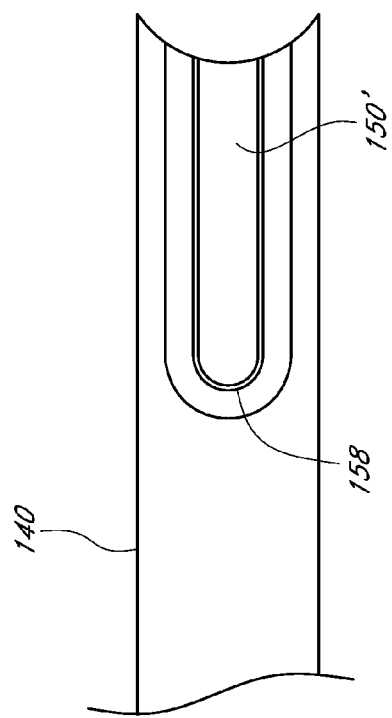
FIG. 4B is an alternate embodiment of a top tube weld portion from FIG. 2.

With reference to FIGS. 3 and 4A-B, additional views of the top tube 140 are illustrated. The top tube 140 has a tube portion 141 and a weld portion 150. The top tube 140 is formed from a wall having a first or outer surface 142 and a second or inner surface 144. The inner surface 144 forms a cavity 146 throughout the top tube 140. The tube portion 141 has a first thickness 148 that is desirably substantially uniform. The top tube weld portion 150 is situated on the underside of the top tube 140. The weld portion 150 can be integrally formed into the top tube 140. In some embodiments the weld portion 150 can be coupled to the top tube 140 after the top tube 140 is formed. The weld portion 150 has a second thickness 151 extending from the dashed line to the top surface 154 of the weld portion 150. In this embodiment the thickness of the weld portion 150 is greater than the thickness at the tube portion 141. In other embodiments the weld portion 150 can have the same thickness or be thinner than the tube portion 141.

The top tube weld portion 150 has a top surface 154, an outer edge 156, and a sidewall 152. The top tube weld portion extends from a proximal end 159 to a distal end 158 away from the head tube 110. The top tube weld portion 150 can be configured to match the down tube weld portion 130. The outer edge 156 can have a rounded edge or sharp edge. The outer edge 156 defines the shape of the weld portion 150. In the embodiment illustrated in FIG. 4A, the top tube weld portion 150 has a substantially triangular shape. The width of the triangle is greatest at the base or proximal end 159 and decreases to the point or distal end 158 of the weld portion 150. The distal end 158 of the weld portion 150 is rounded. In the embodiment illustrated in FIG. 4B, the top tube weld portion 150' has a substantially rectangular shape with a rounded distal end 158'. In this embodiment, the bottom tube weld portion would be configured to have a substantially matching rectangular shape.

The curvature or radius at the distal end 158 of the weld portion 150 is configured so that it is easier to weld and a substantially smooth and uniform weld can be formed around the distal end 158. The sidewall 152 extends out of the top tube 140. The height of the sidewall 152 can be substantially uniform. In some embodiments the height of the sidewall 152 can vary. The height of the sidewall 152 is configured so that the top surface 154 is flush with a top surface 134 of the down tube weld portion 130. The length of the weld portion 150 from the proximal end 159 to the distal end 158 can vary dependent upon the geometry of the top tube 140 and the down tube 120.

Figure 5:
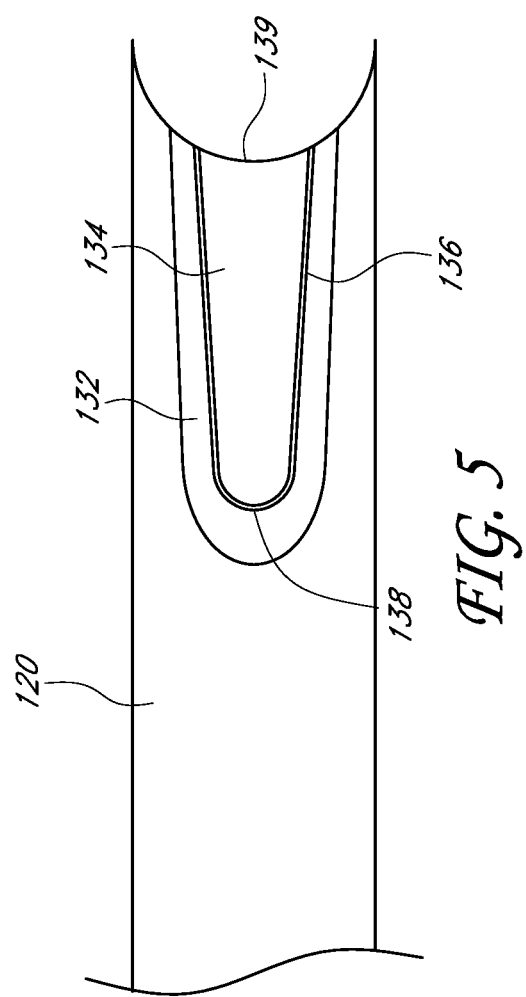
FIG. 5 is a view of the down tube from FIG. 2.

With reference to FIGS. 3 and 5, additional views of the down tube 120 are illustrated. The down tube 120 has a tube portion 121 and a weld portion 130. The down tube 120 is formed from a wall having a first or outer surface 120 and a second or inner surface 124. The inner surface 124 forms a cavity 126 throughout the down tube 120. The tube portion 121 has a first thickness that is substantially uniform. The weld portion 130 is situated on the underside of the down tube 120. The weld portion 130 can be integrally formed into the down tube 120. In some embodiments the weld portion can be coupled to the down tube 120 after the down tube 120 is formed. The weld portion 150 has a second thickness. In this embodiment, the thickness of the weld portion 130 is greater than the thickness of the tube portion 121. In other embodiments the weld portion 130 can have the same thickness or be thinner than the tube portion 121.

The down tube weld portion 130 has a top surface 134, an outer edge 136, and a sidewall 132. The down tube weld portion 130 extends from a proximal end 139 to a distal end 138 away from the head tube 110. The down tube weld portion 130 can be configured to match the top tube weld portion 150. The outer edge 136 can have a rounded edge or a sharp edge. The outer edge 136 defines the shape of the weld portion 130. In this embodiment, the down tube weld portion 130 has a substantially triangular shape. The width of the triangle is desirably greatest at the base or proximal end 139 and desirably decreases to the rounded point or distal end 138 of the weld portion. The distal end 138 of the weld portion 130 is rounded. In other embodiments, the bottom tube weld portion 130 could be configured to have a substantially rectangular shape, substantially matching the shape illustrated in FIG. 4B.

The curvature or radius at the distal end 138 of the weld portion 130 is desirably configured so that it is easier to weld and a substantially smooth and uniform weld can be formed around the distal end 138. The sidewall 132 extends out of the down tube 140. The height of the top tube is the desirably least at the proximal end 139 and greatest at the distal end 138 as the down tube 120 begins to slope downward and away from the top tube 140. In some embodiments the height of the sidewall 132 can be substantially uniform. The height of the sidewall 132 is configured so that the top surface 134 is desirably flush with a top surface 154 of the top tube weld portion 150. The length of the weld portion 130 from the proximal end 139 to the distal end 138 can vary dependent upon the geometry of the down tube 140 and the down tube 120.

The weld portion 130 and 150 can be configured so that the outer edges 138 and 158 are substantially aligned, and surfaces 134 and 154 are substantially flush. Desirably the surfaces can be in contact at least 25%, 35%, 50%, 65%, 75%, 90%, or essentially the entire surface area of at least one of surfaces 134 or 154, and preferably, both 134 and 154.

FIGS. 2 and 3 illustrate the weld interface 170, also referred to as a weld joint, between the top tube weld portion 150 and the bottom tube weld portion 130. FIG. 3 illustrates a cross-section of the assembly 100 of the top tube 140 and the down tube 120. The top tube weld portion 150 is positioned so that it is adjacent the down tube weld portion 130. The tube portion of the top tube 141 and the tube portion of the down tube 121 desirably do not contact each other. The top surface of the top tube weld portion 152 and the top surface of the down tube weld portion 132 are configured so that the surfaces are desirably substantially flush along the length of the weld portions 130 and 150. In this embodiment the surfaces 134 and 154 are substantially flat. In this embodiment the weld portions 130 and 150 are substantially triangular. In some embodiments the weld portions can be elliptical or rectangular with a hemispherical distal end portion (as illustrated in FIG. 4B). The surface area in contact between surfaces 134 and 154 is desirably at least 0.75 square inches, 1 in$^2$, 1.5 in$^2$, 2 in$^2$, 2.5 in$^2$, 3 in$^2$, 4 in$^2$ and desirably between 3 in$^2$ and 4 in$^2$.

The weld portions 130 and 150 form a weld joint 170 at the juncture between the outer edges 158 and 138. The size and configuration of the weld portions 130 and 150 generally define a weld angle θ and a weld length. The weld angle θ is the angle of the weld relative to the sidewalls 152 and 132. Preferably the weld angle θ is between 70 and 180 degrees, 90 and 180 degrees, 120 and 180 degrees, and 150 and 180 degrees. The weld length is the length from the proximal end 159 to the distal end 158.

The length of the weld joint from proximal to distal end can be determined based on the space between tube portion of the top tube 141 and the tube portion of the down tube 121 at the distal end of the weld joint 170. The weld portions 130 and 150 extend a sufficient length such that a uniform weld joint 170 can be formed along the sides and around the distal end of the weld portions 130 and 150. Preferably the weld portions 130 and 150 are configured to extend a sufficient distance from the head tube 110 such that there is enough separation between the tube portion of the top tube 141 and the tube portion of down tube 121 so that the weld does not cause the top tube 140 to be pulled towards the down tube 120. The separation between the tube portion of the top tube 141 to the tube portion of down tube 121 can be desirably, at least 0.5 millimeters, 1 millimeter, 2 mm, 3 millimeters, 4 millimeters, 6 millimeters, 8 millimeters, 10 millimeters, 12 millimeters, or more. Desirably the separation can be between 1 to 3 millimeters, between 3 to 6 millimeters, or between 6 to 12 millimeters.

The result of the formation of the weld joint 170 by the weld portions 130 and 150 is a substantially uniform cross-section that is easier to weld. The weld bead desirably can be formed substantially along the weld joint 170 without having to fill gaps between the top tube and down tube. The engineered weld joint 170 desirably provides a better defined weld between the top tube 140 and the down tube 120 that reduces variability between welders, resulting in welds that can be more uniform and smaller. The resulting welds can desirably also be more esthetically pleasing and cleaner, requiring reduced grinding, filing, or sanding. Additionally, the welds desirably do not cause the tubes 140 and 120 to pull together, which reduces weld stress on the joint. This also reduces the amount of residual stress in the frame. Due to reduced stress in the frame, tubes desirably can be made thinner and lighter without losing strength. The resulting joint desirably provides advantages in terms of a better fit, strength, and aesthetic appearance.

Figure 6A:
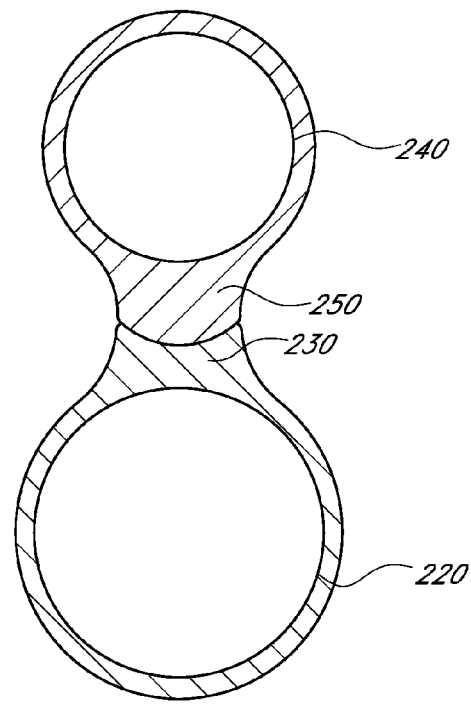
FIGS. 6A-B are cross sections of other embodiments of a head tube and down tube.
Figure 6B:
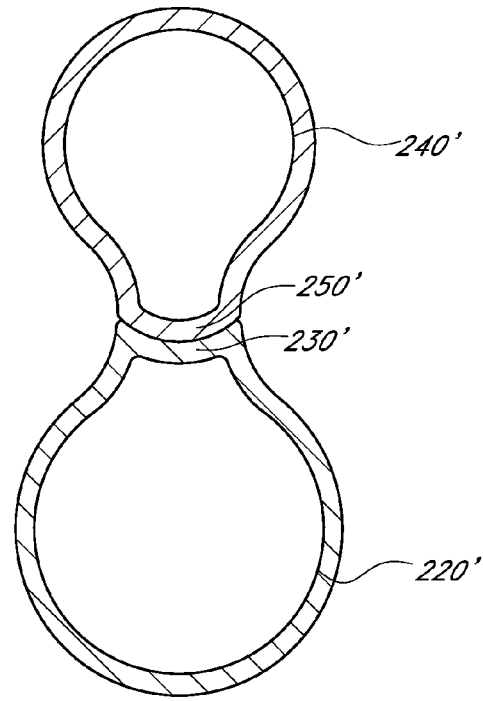

FIGS. 6A and 6B are alternate embodiments of cross-sections of a top tube 240 and a down tube 220. There is a top tube weld portion 250 and a down tube weld portion 230. In this embodiment the surfaces of the weld portions 230 and 250 have complimentary curved or rounded surfaces. The top tube surface 254 curves downward or has a convex curvature and the down tube surface 234 curves downward or has a concave curvature. The mating curvature of the surfaces increases the contact between the top tube weld portion 250 and the down tube weld portion 230. The curvature also helps fit the tubes together and makes it easier for the welder to align the weld joint. FIG. 6B illustrates embodiments where the weld portions 230' and 250' can have substantially the same thickness or can be thinner than the thickness of the top tube 240' and down tube portions 220'.

Figure 7A:
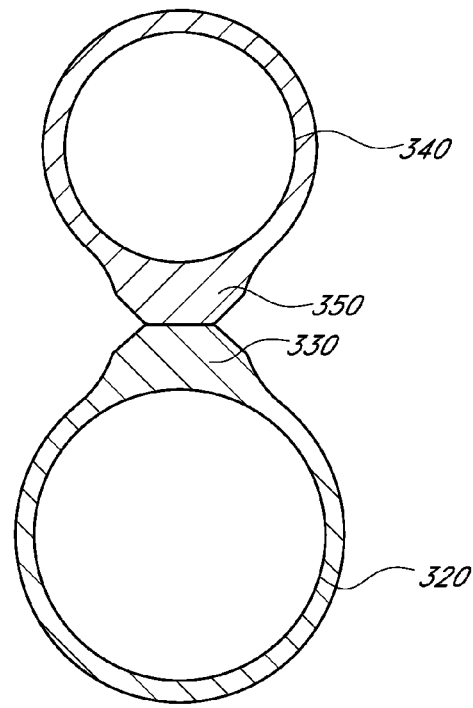
FIGS. 7A-B are cross sections of other embodiments of a head tube and down tube.
Figure 7B:
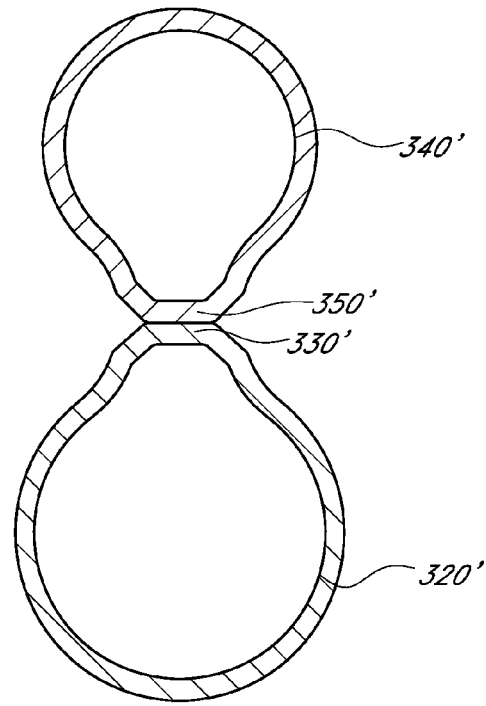

FIGS. 7A and 7B are additional embodiments of cross-sections of a top tube 340 and a down tube 320. There is a top tube weld portion 350 and a down tube weld portion 330. In this embodiment the weld portions 330 and 350 are configured to form a weld joint 370 having a weld angle of approximately 90 degrees. The weld joint 370 can be sized so that the weld beads are substantially flush, or might protrude slightly outward from the joint beyond the outer surfaces of the weld portions. The weld can then be finished (e.g., ground, filed, sanded, etc.), if necessary, until it is flush with the outer surfaces of the tubes. The result is a welded bicycle frame that can appear to be a single piece molded bicycle frame. FIG. 7B illustrates embodiments where the weld portions 330' and 350' can have substantially the same thickness or can be thinner than the thickness of the top tube 340' and down tube portions 320'.

Figure 8A:
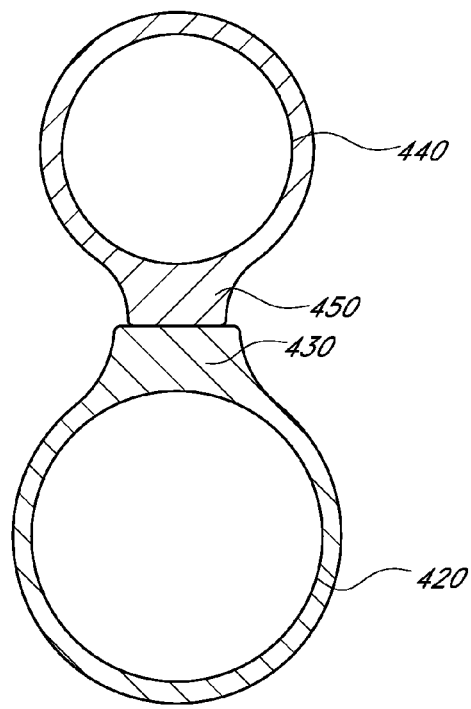
FIGS. 8A-B are cross sections of other embodiments of a head tube and down tube.
Figure 8B:
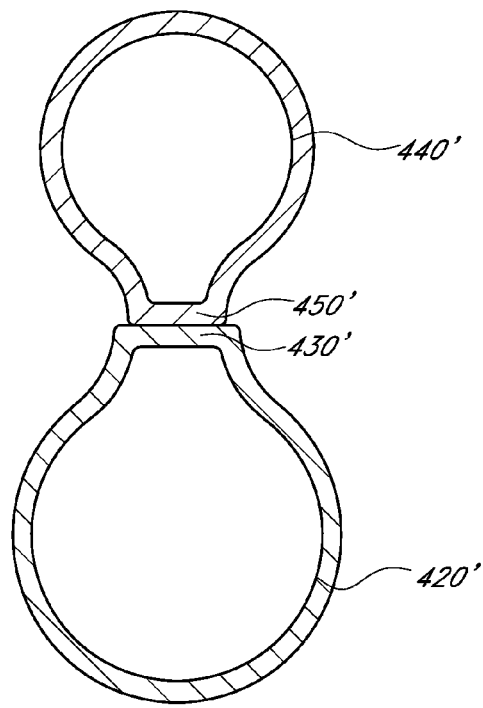

FIGS. 8A and 8B are additional embodiments of cross-sections of a top tube 440 and a down tube 420. There is a top tube weld portion 450 and a down tube weld portion 430. In this embodiment the weld portions 430 and 450 are slightly offset and a lip is formed between the top tube weld portion 450 and the down tube weld portion 430. The offset portion can provide additional surface area between the weld portions to form the weld. FIG. 8B illustrates embodiments where the weld portions 430' and 450' can have substantially the same thickness or can be thinner than the thickness of the top tube 440' and down tube portions 420'.

Figure 10:
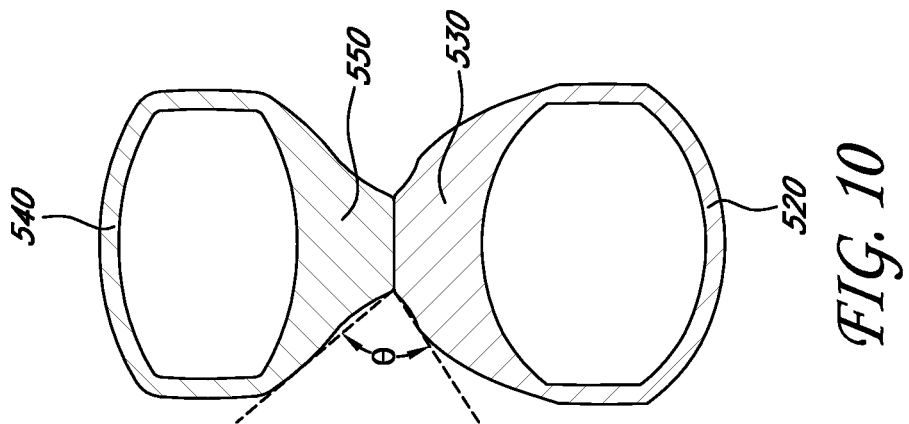
FIG. 10 is a cross section of the top tube and down tube from FIG. 9.
Figure 9:
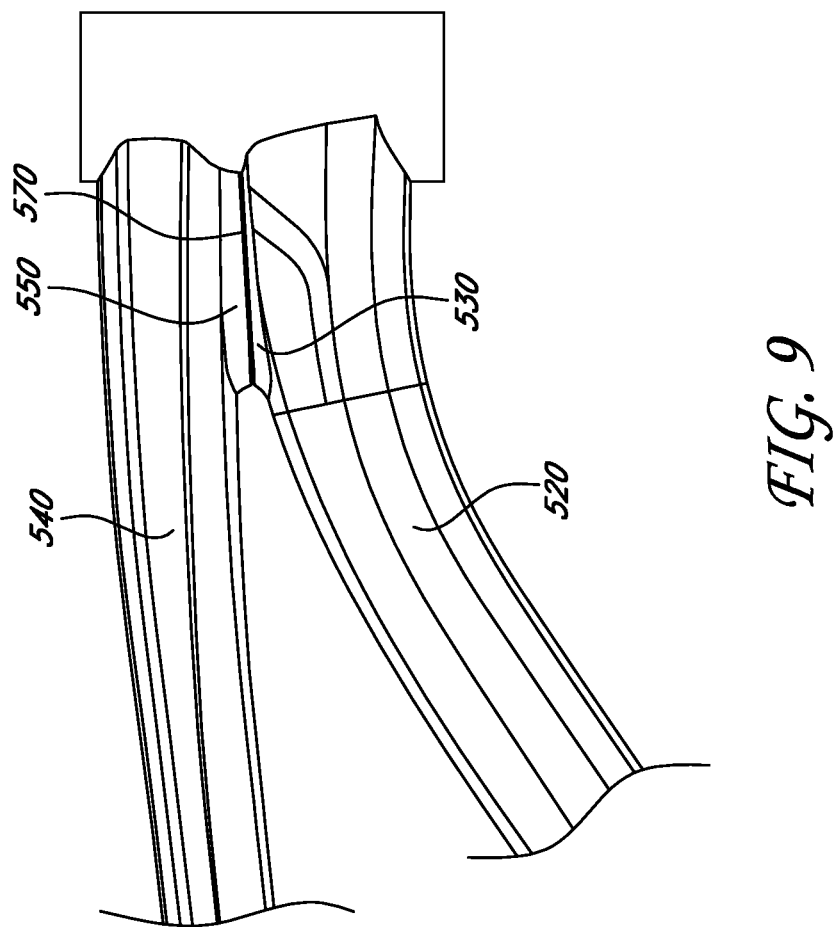
FIG. 9 is another embodiment of an assembly of a head tube, top tube, and down tube.

FIGS. 9 and 10 illustrate another embodiment of a top tube 540 and a down tube 530. There is a top tube weld portion 550 and a down tube weld portion 530. In this embodiment the tubes are shaped tubes. The weld portions 530 and 550 are integrated into and formed as part of the tubes. In this embodiment the top tube weld portion 550 and the bottom tube weld portion 530 have unequal heights. The top tube weld portion 550 extends out substantially more than the bottom tube weld portion 530. The weld portions 530 and 550 form a weld joint 570 that is substantially uniform around the weld portions. The weld angle θ of the weld joint 570 is not evenly distributed between the top tube weld portion 550 and the down tube weld portion 530. In some embodiments the down tube weld portion can have a greater height than the top tube weld portion. In some embodiments there is only a weld portion on the top tube or the down tube. For example the top tube weld portion can extend downwardly to the down tube to create a complementary connection between the top tube weld portion and the down tube. Alternatively, the down tube weld portion could be formed to extend upwardly to create a complementary connection between the down tube weld portion and the top tube.

Figure 11:
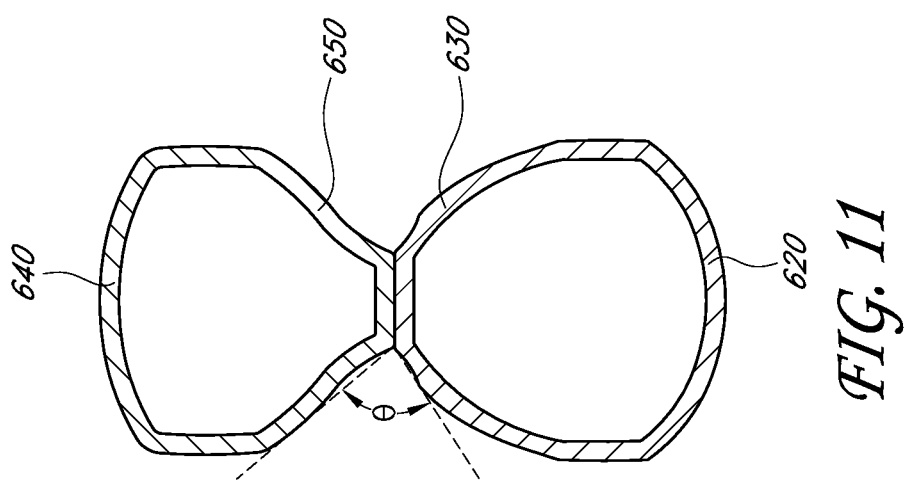
FIG. 11 is a cross section of another embodiment of a head tube and down tube.

FIG. 11 is another embodiment of a cross-section of a shaped top tube 640 and a shaped down tube 620. In this embodiment the tubes have a substantially uniform thickness, where the weld portions have substantially the same thickness as the tube portions. Reducing the thickness of the weld portions can reduce the weight of the top tube and the down tube.

Figure 12:
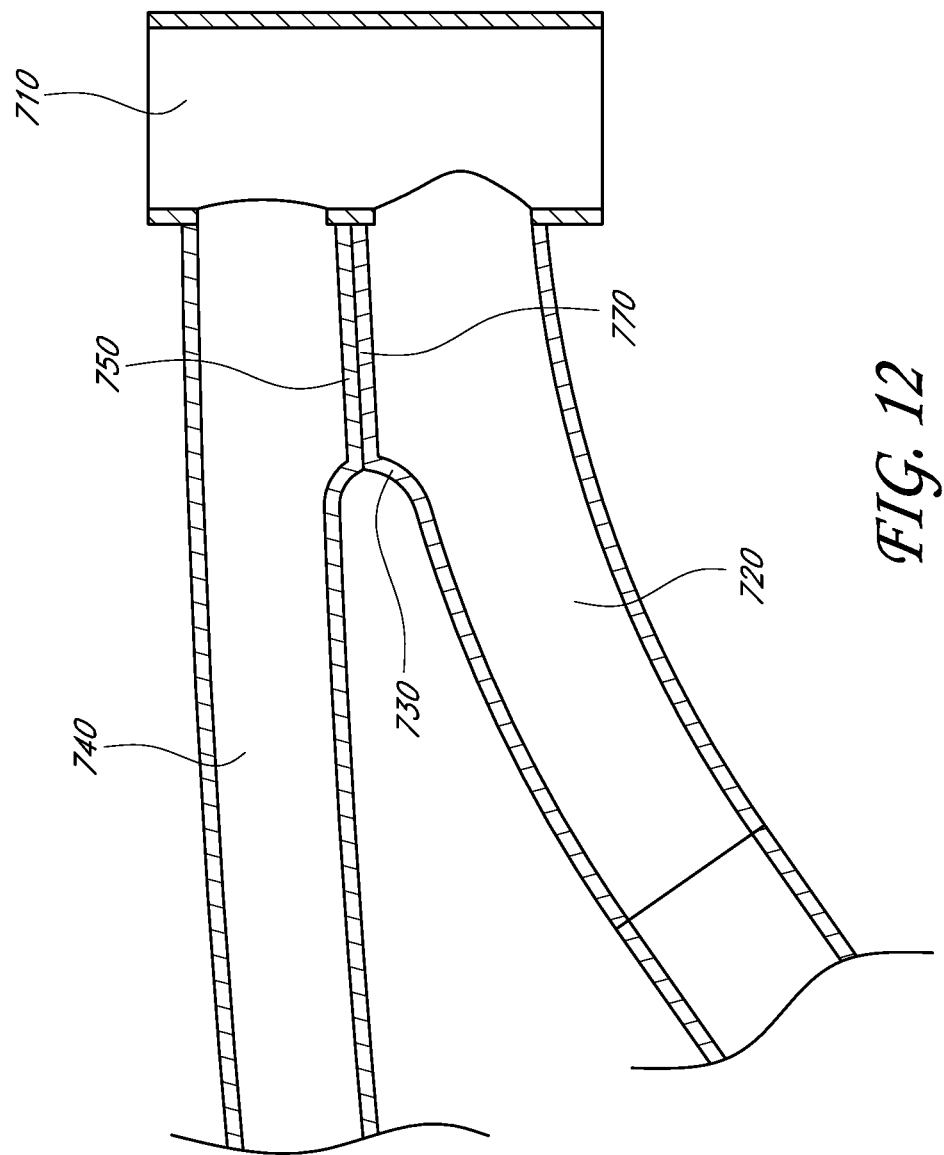
FIG. 12 is another embodiment an assembly of a head tube, top tube, and down tube.

FIG. 12 is a section view of an embodiment of the head tube 710, top tube 740, and down tube 720. The section view shows the top tube weld portion 750 and the bottom tube weld portion 730. The weld portions 750 and 730 can be formed by expanding or hydroforming the top tube 740 and down tube 720. Depending on the size of the weld portions 150' and 130', the thickness of the weld portions 750 and 730 can be thinner, substantially the same, or thicker than the thickness of the top tube 740 and down tube 720.

In other embodiments the weld portion can be positioned on either the top tube or the down tube. In this embodiment the surface of the weld portion is configured to match the curvature of the tube. In another embodiment the weld portions are coupled to the tubes after the tubes have been formed. The weld portions can be welded to the tubes or coupled using another method.

The weld portions and weld joint described herein are equally applicable to tubes of almost any constant or varying cross-section shape, such as tubes with aerodynamic shapes, oval tubes, and round tubes. Additionally, the method can be applied to other parts of a bicycle frame, for example, the interface between the seat tube and the seatstays. The method applies equally well to aluminum, steel, titanium or tubing made from other metals. This feature can be applied to all types of bicycles, including, but not limited to, hardtail mountain bikes, full-suspension mountain bikes, BMX bikes, and road bikes.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A bicycle, comprising:
 a first tube having a first tube portion and a first weld portion, the first tube portion has a first tube portion thickness and the first weld portion has a first weld portion thickness, the first weld portion has a first mating surface and a first outer edge, wherein the first weld portion extends outward from the first tube portion;
 a second tube having a second tube portion and a second weld portion, the second tube portion has a second tube portion thickness and the second weld portion has a second weld portion thickness, the second weld portion has a second mating surface and a second outer edge, wherein the first mating surface is positioned adjacent to the second mating surface such that a weld interface is formed at a juncture between the first outer edge and the second outer edge;

a weld bead formed along the weld interface coupling the first weld portion and the second weld portion; and wherein the combined thickness of the first weld portion thickness and the second weld portion thickness is at least 1 millimeters.

2. A bicycle, comprising:

a first tube having a first tube portion and a first weld portion, the first tube portion has a first tube portion thickness and the first weld portion has a first weld portion thickness, the first weld portion has a first mating surface;

a second tube having a second tube portion and a second weld portion, the second tube portion has a second tube portion thickness and the second weld portion has a second weld portion thickness, the second weld portion has a second mating surface, the second weld portion extends outward from the second tube portion, wherein the first mating surface is positioned adjacent to the second mating surface, forming a weld interface between the first tube and the second tube; and a weld bead formed along the weld interface coupling the first weld portion and the second weld portion;

wherein the combined thickness of the first weld portion thickness and the second weld portion thickness is at least 1 millimeters, wherein the first weld portion and the second weld portion are substantially triangular.

3. The bicycle of claim 1, wherein the first weld portion is integral with the first tube.

4. The bicycle of claim 1, wherein the second weld portion is integral with the second tube.

5. The bicycle of claim 1, wherein first weld portion thickness is less than the first tube portion thickness.

6. The bicycle of claim 1, wherein second weld portion thickness is greater than the second tube portion thickness.

7. The bicycle of claim 1, wherein first weld portion thickness is substantially the same as the first tube portion thickness.

8. The bicycle of claim 1, wherein second weld portion thickness is substantially the same as the second tube portion thickness.

9. The bicycle of claim 1, wherein second tube portion thickness is greater than the first tube portion thickness.

10. The bicycle of claim 1, wherein a weld angle is greater than 90 degrees.

11. A bicycle, comprising:

a first tube having a first tube portion and a first weld portion, the first tube portion has a first tube portion thickness and the first weld portion has a first weld portion thickness, the first weld portion has a first mating surface;

a second tube having a second tube portion and a second weld portion, the second tube portion has a second tube portion thickness and the second weld portion has a second weld portion thickness, the second weld portion has a second mating surface, wherein the first mating surface is positioned adjacent to the second mating surface, forming a weld interface between the first tube and the second tube; and a weld bead formed along the weld interface coupling the first weld portion and the second weld portion;

wherein the combined thickness of the first weld portion thickness and the second weld portion thickness is at least 1 millimeters, wherein the weld bead is in contact with the first weld portion and the second weld portion and is not in contact the first tube portion and the second tube portion simultaneously.

12. The bicycle of claim 1, wherein first weld portion is substantially the same shape as the second weld portion.

13. The bicycle of claim 1, wherein the weld interface defines a weld angle that is substantially constant along the length of the weld interface.

14. The bicycle of claim 1, wherein the combined thickness of the first weld portion thickness and the second weld portion thickness is 12 millimeters.

15. A bicycle, comprising a first tube having a first tube portion and a first weld portion, the first tube portion has a first tube portion thickness and the first weld portion has a first weld portion thickness, the first weld portion has a first mating surface and a first outer edge, wherein the first weld portion extends outward from the first tube portion;

a second tube having a second tube portion and a second weld portion, the second tube portion has a second tube portion thickness and the second weld portion has a second weld portion thickness, the second weld portion has a second mating surface and a second outer edge, wherein the first mating surface is positioned adjacent to the second mating surface such that a weld interface is formed at a juncture between the first outer edge and the second outer edge;

a weld bead formed along the weld interface coupling the first weld portion and the second weld portion;

wherein the weld interface defines a weld angle that is at least 90 degrees along the length of the weld interface.

16. The bicycle of claim 11, wherein the weld angle varies along the length of the weld interface.

17. The bicycle of claim 11, wherein the weld angle is substantially constant along the length of the weld interface.

18. The bicycle of claim 11, wherein the first mating surface and the second mating surface are substantially planar.

19. The bicycle of claim 11, wherein the first mating surface is convex and the second mating surface is concave.

20. A method of welding a bicycle, comprising the steps;

positioning the top tube adjacent a head tube, the top tube having a first tube portion and a first weld portion;

positioning a down tube adjacent the head tube, the down tube having a second tube portion and a second weld portion;

positioning the first weld portion adjacent the second weld portion to form a weld interface, the weld interface defines a weld angle that is at least 90 degrees along the length of the weld interface; and welding the first weld portion and the second weld portion substantially at the weld interface.

* * * * *